S. EARLE.
Animal-Trap.

No. 214,119. Patented April 8, 1879.

Witnesses:
J. W. Garner
W. S. D. Haines

Inventor:
Sidney Earle,
per
J. A. Lehmann
Atty.

UNITED STATES PATENT OFFICE.

SIDNEY EARLE, OF CORRY, PENNSYLVANIA.

IMPROVEMENT IN ANIMAL-TRAPS.

Specification forming part of Letters Patent No. 214,119, dated April 8, 1879; application filed August 27, 1878.

*To all whom it may concern:*

Be it known that I, SIDNEY EARLE, of Corry, in the county of Erie and State of Pennsylvania, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in forming the hook or spear upon which the bait is placed in two parts, and so connecting them together that either an upward or downward pull upon the bait will release the latch and let the spring fall, as will be more fully described hereinafter.

Figure 1:
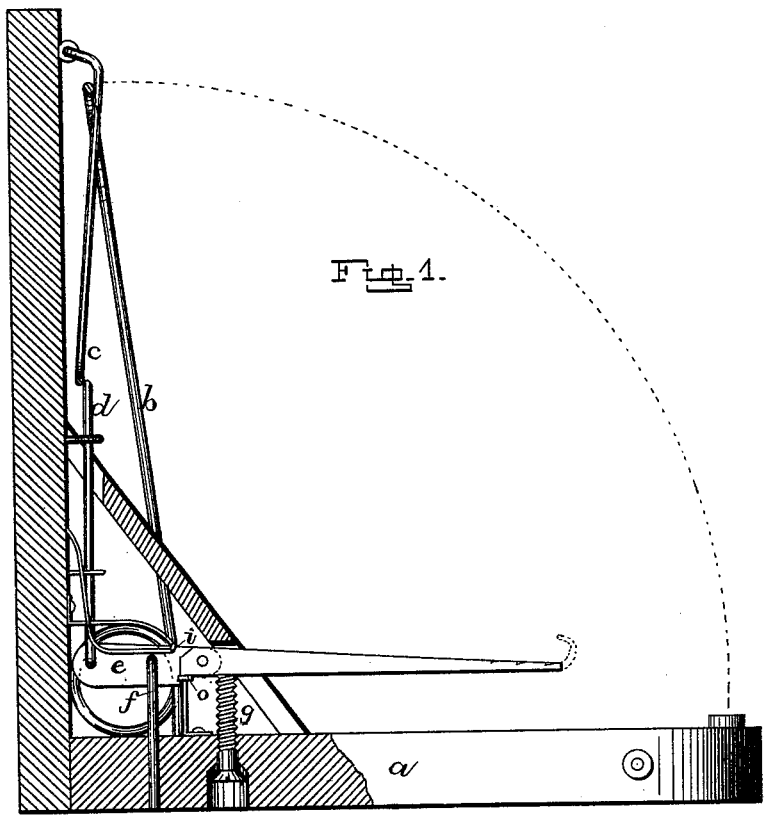
Figure 2:

In the accompanying drawings, Figure 1 is a side elevation of my invention, partly in section. Fig. 2 is a detail view.

$a$ represents the frame of the trap; $b$, the spring, coiled at its inner ends; $c$, the latch; and $d$, the trigger. The lower end of the trigger is hooked into the rear end of the hook or spear $e$, upon the outer end of which the bait is placed, and the spear or hook is fastened or pivoted upon the support $f$, which rises from the base. Some distance outward from this support is the set-screw $g$, which passes up through the base and supports the hook or trigger in position, and regulates the amount of force necessary to set the trap off. By raising the bait end of the spear or hook the inner end is correspondingly lowered, and with it the trigger, and the lower the trigger is drawn downward the slighter the hold of the latch $c$ upon it is, and the easier the spring $b$ will be made to fall.

Between the set-screw $g$ and the support $f$ the spear or hook is divided in two, and the ends of the two pieces are pivoted together. The upper corner of the outer piece is cut away, as shown, so that the lower and outer end of the spring $i$ shall bear upon the top of the inner part of the hook or spear only; and as the spring bears beyond the support $f$ the hook or spear will be made to project horizontally outward, and will instantly return to position after having been moved.

In order to make the two parts of the hook or spear move together when the bait end of the outer piece is moved upward, a flange or projection, $o$, is formed upon the lower edge of the inner piece, near its inner end, so as to catch under the inner corner of the outer part of the hook. When the inner end of the outer piece bears down on the flange the two parts of the spear or hook move upward together as one piece, and draw the trigger downward, so as to release the spring $b$.

The set-screw $g$ also serves as a fulcrum for the outer end of the spear or hook to move upon, so that when the outer end is drawn downward the inner end of the other part of the hook will be raised upward, and thus the trigger will be drawn downward as readily as though the entire hook had been raised upward.

I am aware that the rod upon which the bait is placed has been made in two parts, and this I broadly disclaim.

Having thus described my invention, I claim—

In an animal-trap, the hook or spear for receiving the bait made in two parts, one of which has a flange or projection, $o$, in combination with spring $i$, whereby either an upward or a downward pressure on the bait will set the trigger off and cause the spring $b$ to fall, substantially as shown.

In testimony that I claim the foregoing I have hereunto set my hand this 20th day of August, 1878.

SIDNEY EARLE.

Witnesses:
 J. P. DEAN,
 C. S. WILSON.